Nov. 27, 1923.
W. A. ROGERS
1,475,513
SIGNAL
Filed March 10, 1922      2 Sheets-Sheet 2
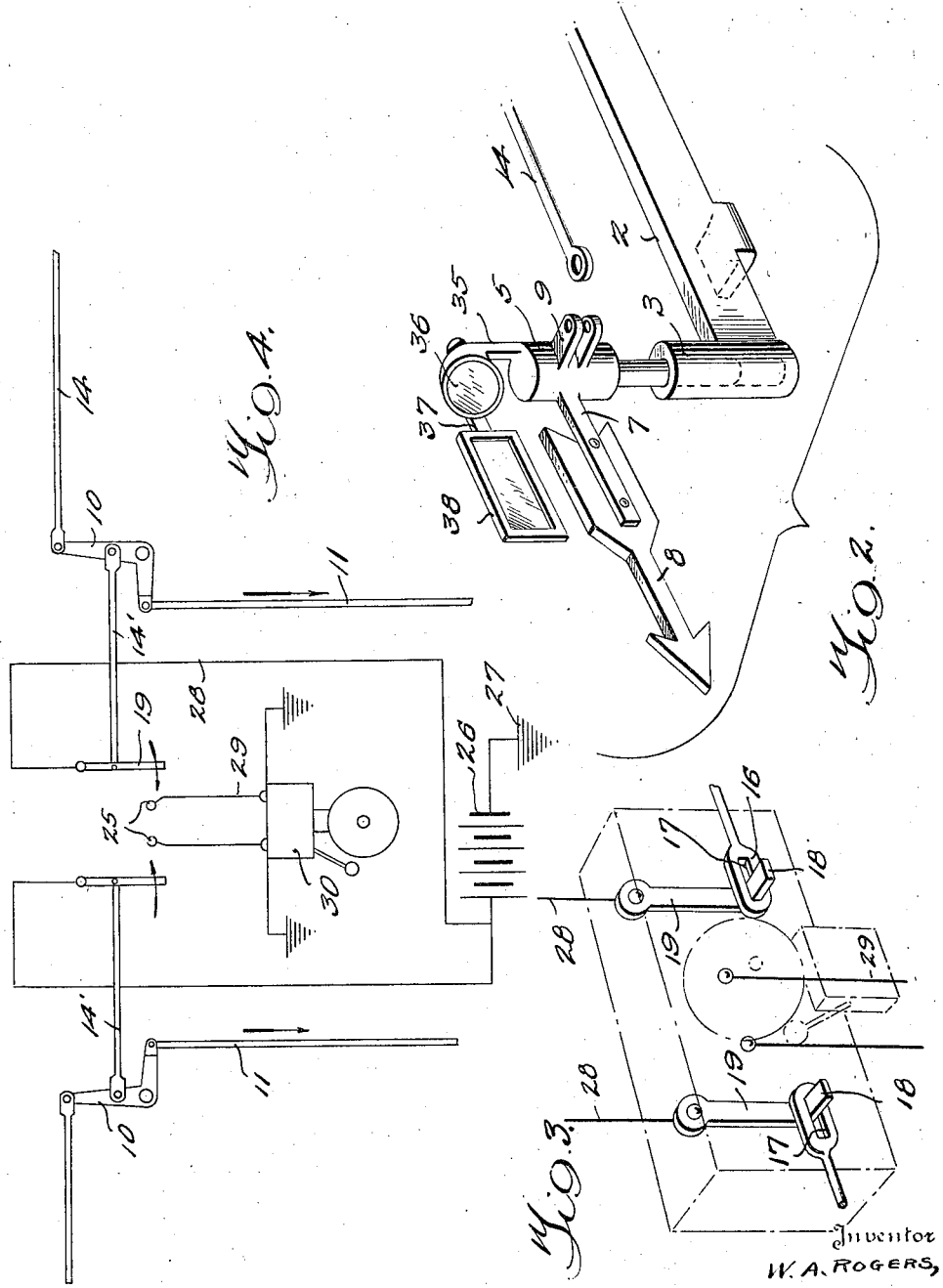
Inventor
W. A. ROGERS,
By Richard B. Owen.
Attorney
WITNESSES
Mabel McLeod Patented Nov. 27, 1923.

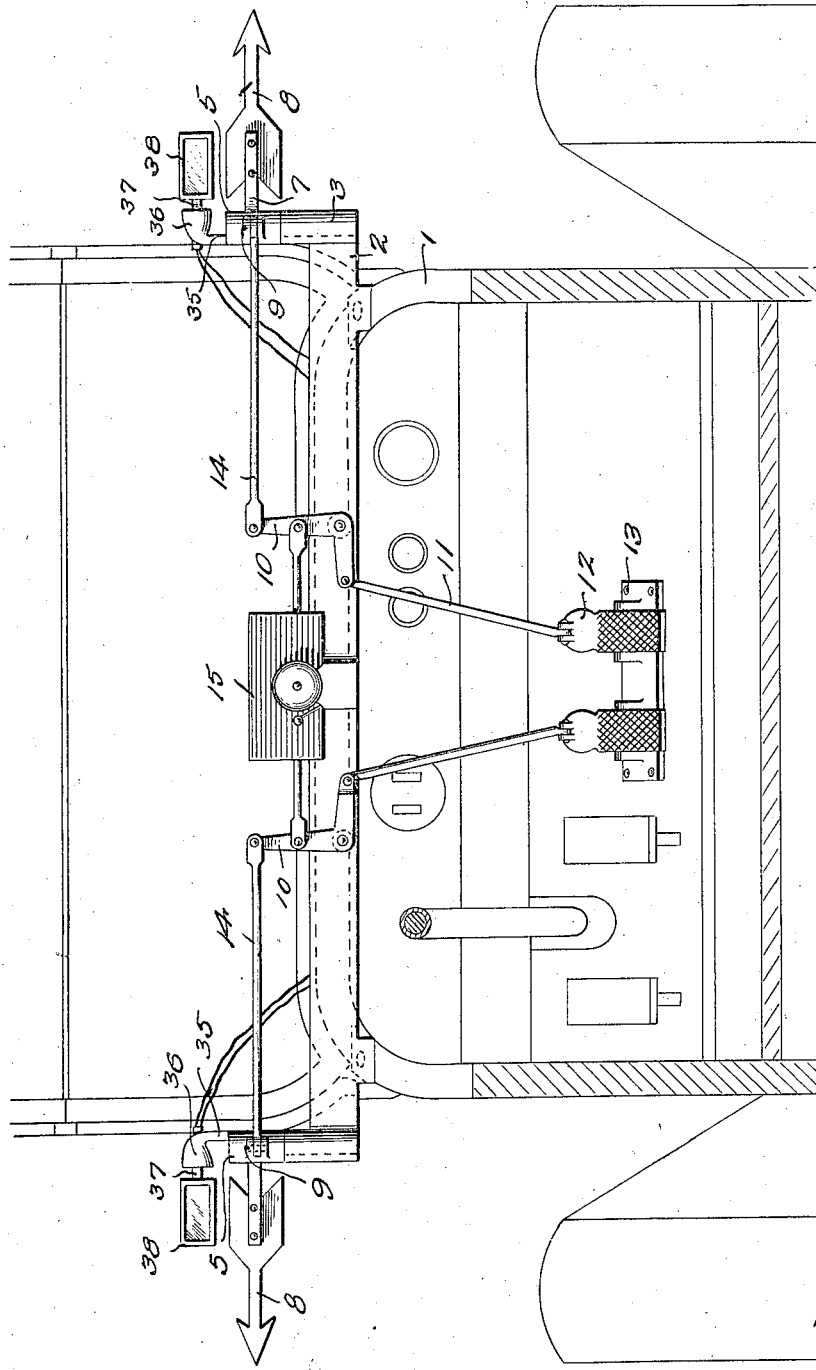

1,475,513

UNITED STATES PATENT OFFICE.

WILLIAM A. ROGERS, OF HARRIS, IOWA.

SIGNAL.

Application filed March 10, 1922. Serial No. 542,574.

*To all whom it may concern:*

Be it known that I, WILLIAM A. ROGERS, a citizen of the United States, residing at Harris, in the county of Osceola and State of Iowa, have invented certain new and useful Improvements in a Signal, of which the following is a specification.

The present invention relates to a signal and more particularly to a direction indicator which is adapted to be used upon motor vehicles and the like, having for its principal object to provide means for signalling to other vehicles or pedestrians the direction intended to be taken by the driver.

Another important object of the invention is to provide an audible signal operated upon movement of the visual signal to a signalling position.

A still further object of the signal is to generally improve upon devices of this nature by providing a structure which will be extremely simple, capable of being manufactured at a comparatively low cost, capable of being placed upon vehicles of various different designs and one which will be reliable in operation and well adapted to the purpose for which it is designed.

With these and numerous other objects in view as will appear from the detailed description to follow, the invention resides in certain novel features of construction, and the combination and arrangement of parts as will be hereiafter described and claimed.

In the drawing:—

Figure 1 is an elevation of the forward portion of an automobile or like vehicle looking from the driver's seat, parts being shown in section, with my invention mounted thereon in its preferred location, Figure 2 is a detailed perspective view of the signalling arm and its bracket showing the parts disassembled, Figure 3 is a detailed perspective view of the switches and operating mechanism therefor, and Figure 4 is a diagram showing the operation of the switches in conjunction with the operating bar.

Referring to the drawing in detail it will be seen that 1 designates the forward portion of a vehicle such as an automobile where it is preferably desired to mount my invention. The signalling mechanism consists of the bar 2 which is provided at its ends with the sleeves 3 for receiving the pins that also pass through the sleeves 5 of the signalling arms 7. These signalling arms 7 consist of the signal portion proper here shown in the form of an arrow 8, sleeves 5 and lugs 9. It is to be noted by referring especially to Figure 6 that the lugs 9 are angularly disposed with respect to the signalling portion of the arms. A pair of bell crank levers 10 are pivoted on the body 1 in spaced relation to each other and the links 11 are pivotally attached to one end thereof. These links 11 are actuated by the pedals 12 which form the operating mechanism. The pedals 12 are mounted in the frame 13 so as to be easily actuated by the foot of the driver of the vehicle. The operating rods 14' are pivoted to the levers 10 and extend through slots in the ends of the box 15 and are flattened as at 16 so as to be provided with slots 17. The lips 18 of the switches 19 project through the slots 17 so that the switch arms will be actuated upon actuation of the operating rods 14.

At one end the bars 14 are provided with eyes 21 for engagement with apertures in the lugs 9 at the other end they are pivoted to the levers 10. Thus it will be seen that if one of the pedals 12 is actuated the signalling arm and the switch will be moved simultaneously with each other through the intermediacy of the bell crank lever 10 and the link 11. In Figure 1 I have shown these parts in an operative or signalling position. The signalling arm extends transversely from the vehicle when the corresponding link 11 is pulled downwardly as will be evident from an inspection of the drawings. As soon as this arm extends transversely from the vehicle the corresponding switch arm 19 will be moved in engagement with the contact 25 thereby closing a circuit so that the current passes from the source of electrical energy 26 which is grounded at 27 over one of the wires 28, through the switch arm 19, contact 25, over one of the wires 29 to the electrically operated bell 30 or other suitable audible signal which is grounded at 31.

A stem 35 projects from each of the sleeves 5 and terminates in a light casing 36 of any preferred construction. An arm 37 projects from the casing 36 for supporting a mirror 38.

From the foregoing description, taken in connection with the accompanying drawings, the construction and operation of the device will be readily understood without a more extended explanation. As numerous changes in form, proportion, and in the minor details of construction may be resorted to without departing from the spirit of this invention, I do not wish to be limited to the construction herein shown and described other than as claimed.

Having thus described my invention what I claim as new is:—

1. In combination, a signal arm, means for swinging the signal arm in a horizontal plane, and a mirror connected to and disposed in the same plane with the signal arm.

2. In combination, a signal arm, a mirror connected to and disposed in the same plane with the signal arm so as to move therewith, a source of illumination mounted on the signal arm so as to throw its rays of light thereon, and means for swinging the signal arm horizontally.

3. In combination with a vehicle, a bracket mounted on one side thereof adjacent the driver's seat, a signal arm mounted on said bracket so as to swing in a horizontal plane, means for swinging the arm, a mirror mounted on the signal arm and movable therewith.

4. In combination with a vehicle, a bracket mounted to one side thereof adjacent the driver's seat, a signal arm mounted on said bracket so as to swing in a horizontal plane, means for swinging the arm, a mirror mounted on the signal arm in the same plane therewith, and a source of illumination mounted on the signal arm so as to throw its rays of light thereon.

In testimony whereof I affix my signature in presence of two witnesses.

WILLIAM A. ROGERS.

Witnesses:
 W. R. THOMAS,
 LILLIAN MEYER.